United States Patent [19]
Dassero

[11] Patent Number: 5,255,033
[45] Date of Patent: Oct. 19, 1993

[54] FOLDING CAMERA

[75] Inventor: William F. Dassero, Rochester, N.Y.

[73] Assignee: Eastman Kodak Company, Rochester, N.Y.

[21] Appl. No.: 859,993

[22] Filed: Mar. 30, 1992

[51] Int. Cl.$^5$ .............................................. G03B 15/03
[52] U.S. Cl. .................... 354/149.11; 354/187
[58] Field of Search .................. 354/126, 149.11, 187, 354/219

[56] References Cited

U.S. PATENT DOCUMENTS

| | | | |
|---|---|---|---|
| Re. 26,763 | 1/1970 | Hennig et al. | 354/149.11 |
| 4,016,580 | 4/1977 | Finelli | 354/219 |
| 4,100,554 | 7/1978 | Iijima | 354/145.1 |
| 4,261,658 | 4/1981 | Uchiyama et al. | 354/126 |
| 4,331,404 | 5/1982 | Johnson | 354/126 |
| 4,350,420 | 9/1982 | Engelsmann et al. | 354/145.1 |
| 4,452,519 | 6/1984 | Fraser et al. | 354/126 |
| 4,508,440 | 4/1985 | Costa et al. | 354/187 |
| 4,515,453 | 5/1985 | Wakabayashi et al. | 354/149.11 |
| 4,557,571 | 12/1985 | Reibl | 354/149.11 |
| 4,819,016 | 4/1989 | Leonard et al. | 354/82 |
| 5,066,967 | 11/1991 | Yamamoto et al. | 354/149.11 |
| 5,084,721 | 1/1992 | Burnham | 354/187 |
| 5,151,728 | 9/1992 | Hendry et al. | 354/187 |

*Primary Examiner*—David M. Gray
*Attorney, Agent, or Firm*—D. Peter Hochberg; Mark Kusner; Michael Jaffe

[57] ABSTRACT

A foldable camera comprises a movable frame interconnected with components including the front element of a compound viewfinder, and a lens/shutter assembly. Also included is a built-in flash unit pivotal through a ninety degrees arc between a horizontal storage position in a recess provided in the camera's encasement, to a vertical, use position. The camera is also furnished with biasing means for extending and retracting the frame between its use and storage positions. The biasing means for extending the mount comprises a pivotal actuating lever having camming slots adapted to receive follower pins located on the flash unit. Pivoting of the flash unit into its use position results in the camming of the lever, urging it against the mount, and causing the latter to move toward the camera's front, thereby extending the lens/shutter assembly and moving the viewfinder element into the recess. Biasing means for retracting the mount comprises springs extending between the mount and the rear of the camera which become operative when the flash unit is pivoted back into the recess, thereby camming the lever away from the mount and allowing positional reversing of the lens/shutter assembly and the front viewfinder element.

15 Claims, 4 Drawing Sheets

FOLDING CAMERA

TECHNICAL FIELD

This invention relates to a camera that can be folded into a compact, closed, storage configuration when not in use, but which can be unfolded into an open, ready-standby position when photographs are to be taken. More particularly, this invention relates to a camera provided with a flash unit and housing-enclosed, lens/-shutter assembly, both of which can be retracted within the camera encasement when the camera is configured in an inactive mode, but which can be deployed in an active mode when photographs are to be taken. Specifically, this invention relates to a fixed-focus camera with an integral, built-in flash unit, manually movable between a camera-storage position, and a camera-operating position, movement of the flash unit causing corresponding movement in a mount holding a viewfinder and baffle cone-lens/shutter assembly between a storage position, and an operating position.

BACKGROUND ART

Picture-taking has long been a subject of interest to both amateurs, as well as to professional photographers, and much effort and money is devoted to its pursuit each year. In view of such interest, the industry supporting photographic activity has designed a wide variety of equipment intended to respond to the needs of individuals so engaged. Cameras have, for example, been designed for taking studio portraits; for underwater picture-taking; for casual, candid photography, and for other uses too numerous to mention. Each of these environments presents different camera design issues and objectives, and considerable ingenuity has been expended on such designs.

In the case of informal photography, for example, photographic opportunities frequently occur in locations and situations requiring that the cameras employed to capture them be rugged and readily portable since they must usually be carried for consisderable distances in a relatively exposed condition, and for extended periods of time. While it is desirable to protect such cameras from injury during this time, and inasmuch as photographic opportunities often present themselves unexpectedly, it is also necessary that cameras designed for taking candid pictures be rapidly and easily deployed in their picture-taking mode. Furthermore, since photographic subjects are commonly encountered in adverse lighting conditions, it is desirable that cameras employed in informal photography be inherently capable of supplying supplemental lighting.

In view of the needs described, a variety of smaller cameras have been designed for casual or candid photography. Many such cameras, however, require the attachment of external flash devices which is often time-consuming. In addition, separate flash equipment is not only cumbersome, but it necessitates the carrying of additional equipment.

To overcome these drawbacks, some cameras have been designed with so-called "built-in" flash units, these being associated with the cameras as an integral part thereof. Unfortunately, however, built-in flash units are often undesirably large, and in some instances, the flash units are located so close to the optical axis of the camera's objective lens that the pupils of the eyes of those being photographed display an objectionable reddish-tint, producing pictures marred by what is termed by photographers as "red-eye". The phenomenon is attributable to the reflection into the camera lens of red light reflected from the retina of eyes illuminated by such flash units.

Other cameras, for instance, those shown in U.S. Pat. No. Re. 26,763, have attempted to overcome some of the problems described by providing an automatically deployable, folding flash unit, attached directly to the camera. Again, however, such designs have often required more bulky cameras to accommodate storage of the flash unit in its inactive position. Furthermore, some components of cameras with built-in flash units are vulnerable to damage, due to their exposed position on the camera, even when the camera is disposed in its storage mode.

Still additional cameras have been proposed, for example, that shown in U.S. Pat. No. 4,452,519, which include an integral flash unit and other camera components essential to the picture-taking process that are automatically deployed when the camera is unfolded for use, but which fold into a protected, enclosed position when the camera is disposed in its storage mode. A common drawback of these cameras, however, stems from the fact that they tend to be relatively complicated, involving extensive operating structure and numerous component parts. As a consequence, such cameras are prone to operational difficulties and are oftentimes expensive. Furthermore, cameras of the type described are often more bulky, and therefore, inconvenient to carry about and to hold during the photographic process.

SUMMARY OF THE INVENTION

The invention is provided by an improvement in cameras that include a lens/shutter assembly, a viewfinder and a flash unit pivotal in an arc between a use and a storage position.

The improvement comprises a movable mount incorporating components including the lens/shutter assembly, and a front element of the viewfinder. Biasing means actuated when the flash unit is pivoted into its use position cause the mount to extend the assembly outwardly from the front of the camera, and to move the front element of the viewfinder toward the front of the camera.

Other biasing means, activated when the flash unit is pivoted into its storage position, cause the mount to retract the assembly back into the camera, and to move the front viewfinder element to the camera's rear.

The invention is also provided by an improvement in a fixed-focus camera including a lens/shutter assembly, a viewfinder with front and rear elements, and a flash unit pivotal in an arc between a storage and a use position.

The improvement comprises a movable mount incorporating components including a front element of the viewfinder, and the lens/shutter assembly. The improvement further includes mount retraction biasing means, a pivotal actuating lever with camming surfaces, and camming surface followers on the flash unit. When the flash unit is pivoted into its use position, the followers force the actuating lever against the mount, moving it and the front viewfinder element toward the front of the camera, simultaneously causing the assembly to extend from the front of the camera. As the flash unit is pivoted to its storage position, the followers propel the lever away from the mount, permitting the retraction biasing means to reposition the mount, causing the assembly to move back into the camera, and the viewfinder element to travel to the camera's rear.

BRIEF DESCRIPTION OF THE DRAWINGS

The invention will be better understood when reference is had to the following drawings, in which like members refer to like parts, and in which.

BEST MODE FOR CARRYING OUT THE INVENTION

Cameras of the type with which the invention is concerned are those known as fixed-focus cameras, typically having the capability of focusing subjects located from about 4 feet to infinity, relative to the camera lens. The cameras of the invention are designed to accommodate a built-in flash unit in a storage recess provided within the body of the camera, and are not only compact, but rugged and easy to hold, form following function in this regard. Although the cameras are manually moved to and from their storage position, they could if desired be provided with motorized means for accomplishing the transition between their active and inactive positions.

Figure 1:
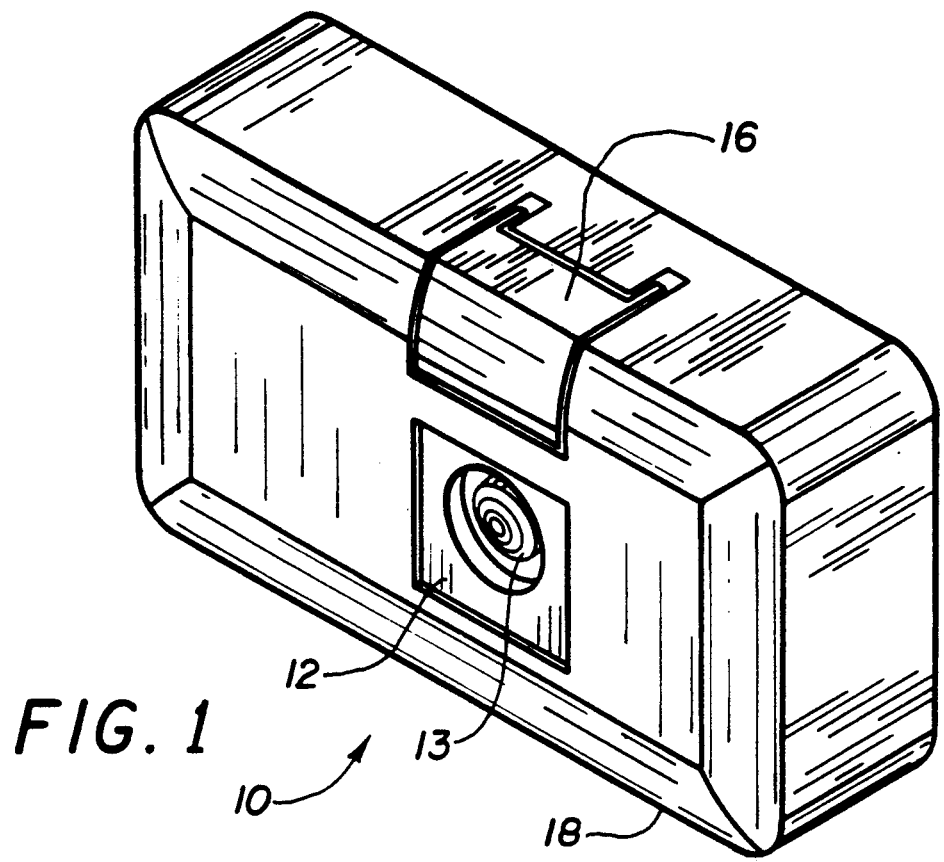
FIG. 1 is an isometric view of the camera of the invention folded into its closed or storage position.

FIG. 1 is an isometric view of the camera, generally 10, folded into its closed or storage position. As shown, the lens/shutter housing enclosing the lens/shutter assembly has been withdrawn into the camera housing or encasement 18 of the camera protecting it from accidental blows and other inadvertent damage. As will be explained in the following, the act of pivoting the flash housing 16 from an erect, use position, downward into its horizontal, stored position, is the action which causes the withdrawal of the lens/shutter housing 12 and its contained lens/shutter assembly 13. As indicated, the camera contemplated by the invention is designed to be compact for easy carrying, therefore, although cameras having different dimensions could make use of the folding concept of the invention, commonly, the length of the camera will be from about 100-125 mm, while its width will conveniently be from about 25 to 40 mm. Such a camera will often have a height of from about 55 to 75 mm.

Figure 2:
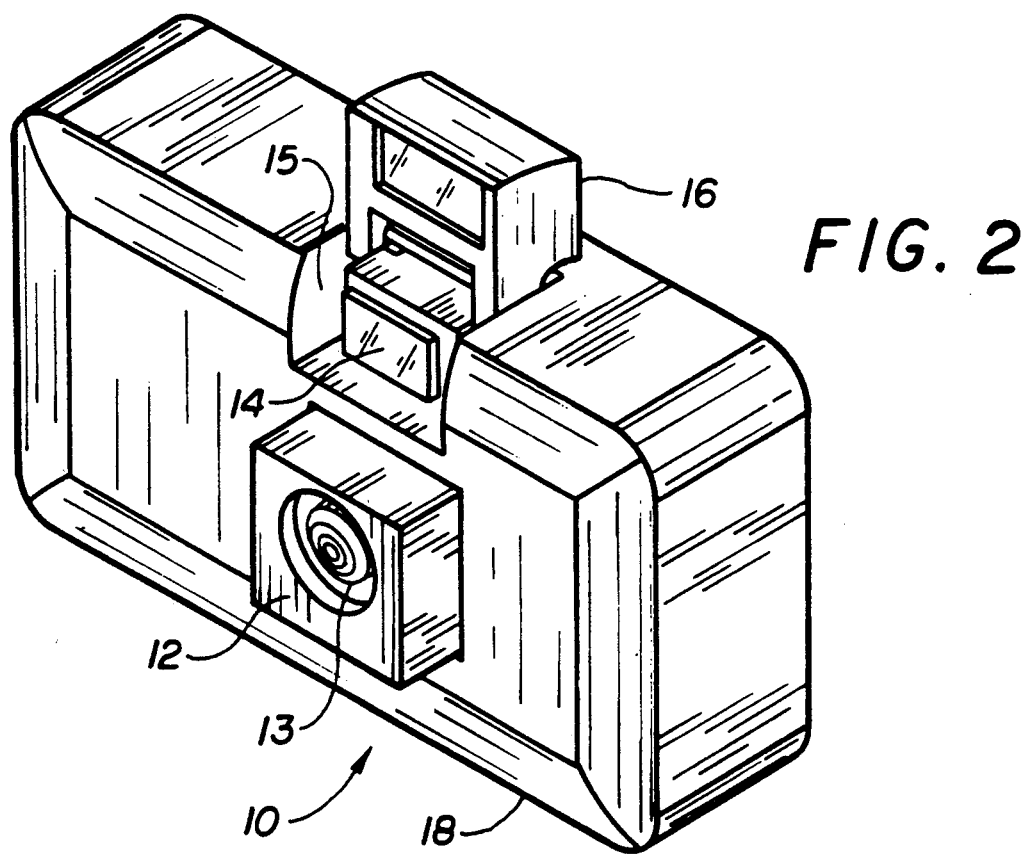
FIG. 2 is an isometric view of the camera of the invention in an open or use position.

FIG. 2 is an isometric view of the camera of the invention, generally 10, in an open, or use position. As shown, the flash housing 16 has been rotated clockwise (when viewed from the left part of the Figure) from its horizontal position of storage in recess 15 of the camera encasement 18 into a vertical, use position. As will be explained in more detail, such action has resulted in propelling the front viewfinder lens component or element 14 into the recess 15 (element 14 can be composed of one or more lens pieces), previously occupied by the flash unit, and has extended the lens/shutter assembly housing 12, and its enclosed lens/shutter assembly 13 outwardly from the front of the camera. In such a deployed mode, the camera, is in a condition for taking photographs.

Desirably, sufficient vertical distance is provided between the flash unit 16 and the axis of the lens-shutter assembly 13 of the camera so that the "red-eye" phenomenon previously referred to is either minimized or eliminated altogether. In order to accomplish this objective, a vertical distance of from about 15 to 20 mm is typically provided, but more preferably, from about 30 to 40 mm.

Figure 3:
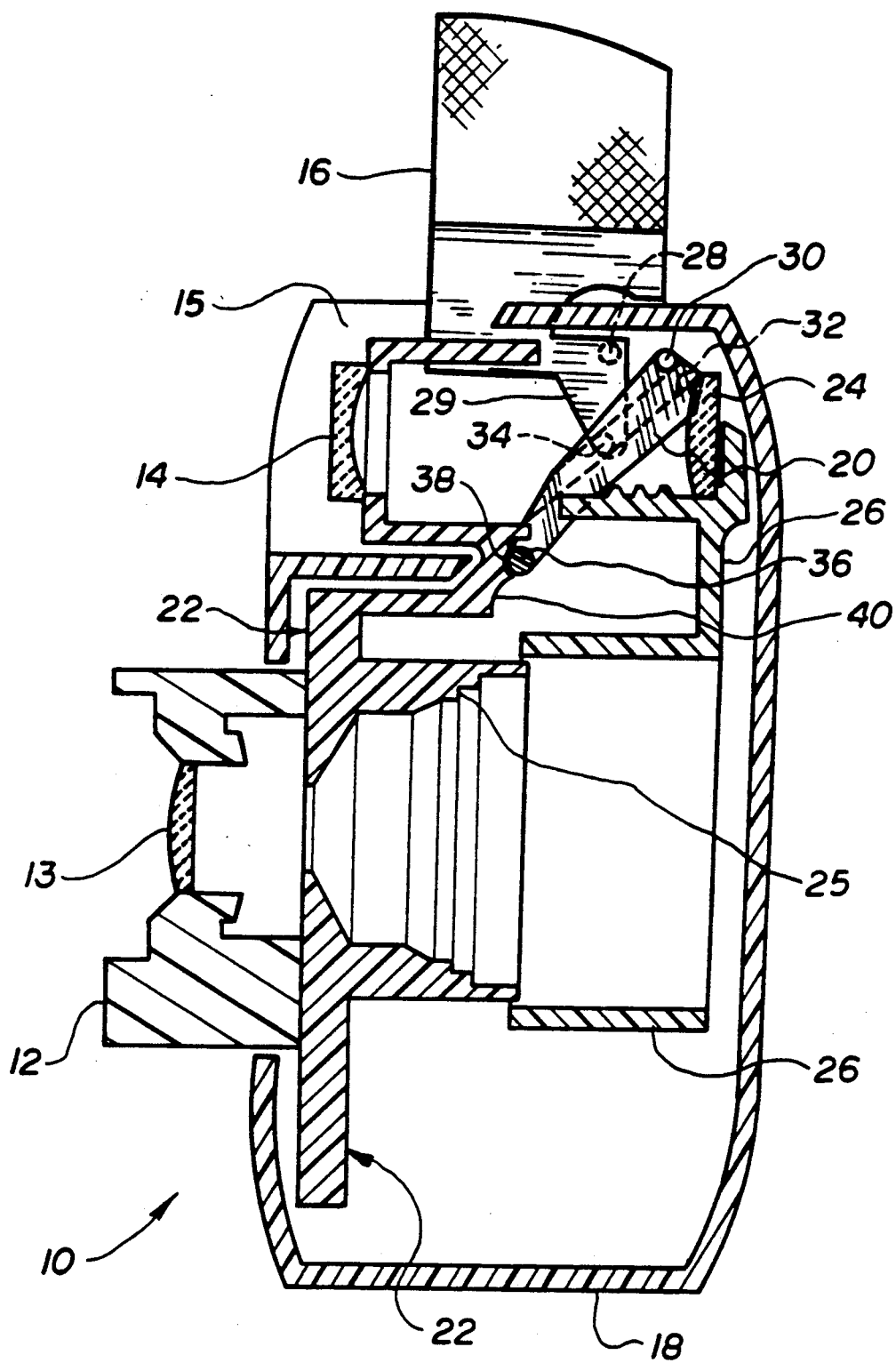
FIG. 3 is a cross-section of the camera of the invention in its open, use position.

FIG. 3 is a cross-section of the camera of the invention, generally 10, in its open, use position. As shown, a flash unit 16 is provided, pivotal about flash unit pivot pin 28. Attached to the flash unit 16 is a pivot arm 29, at the end of which is disposed a flash unit cam follower pin 34.

Figure 5:
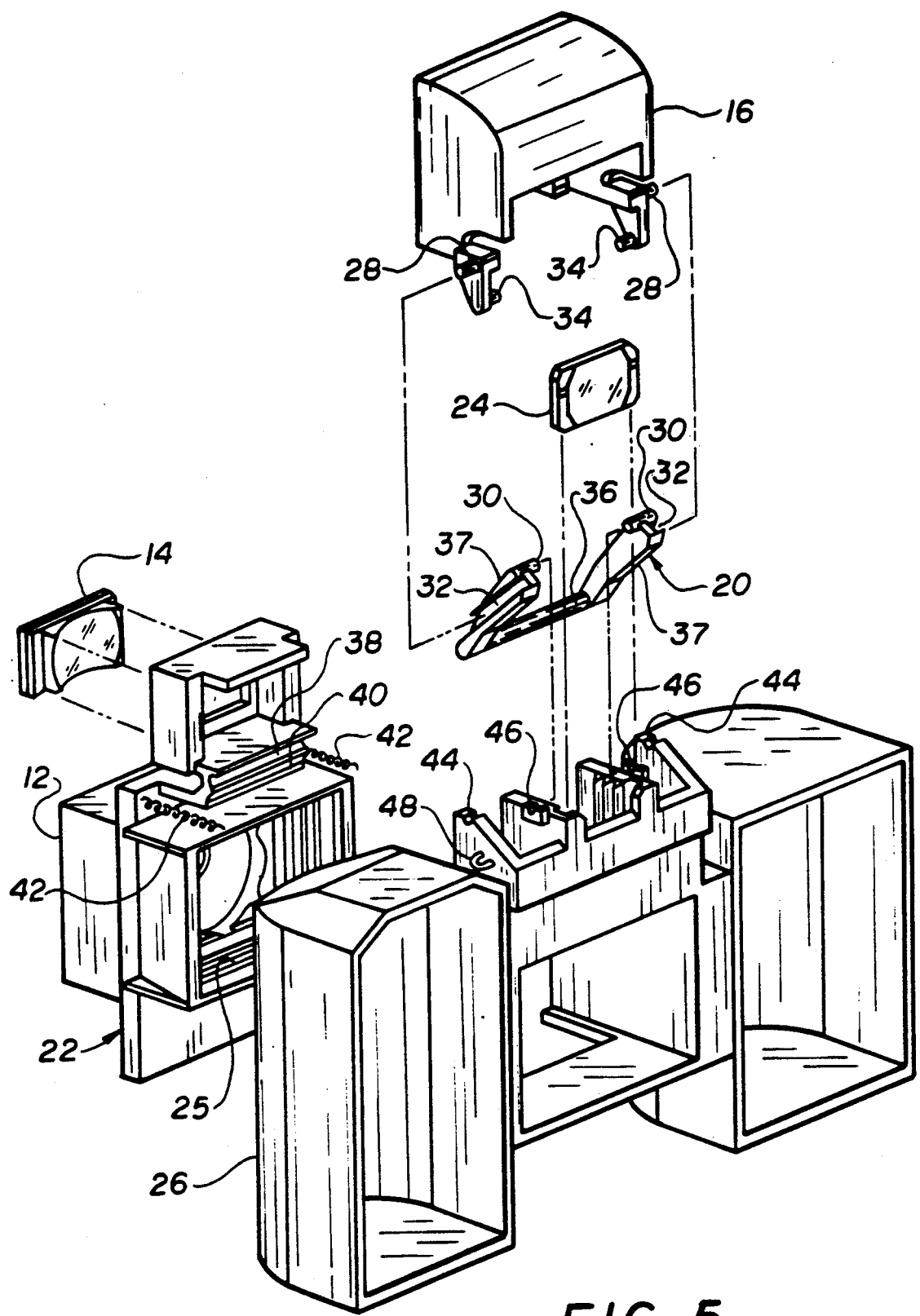
FIG. 5 is an isometric, exploded view of the camera of the invention.

An actuating lever 20, pivotal about actuating lever pivot pin 30, is also provided, the lever having a lever bar 36, better seen in FIG. 5, located on the end thereof. The pivot pins 28 and 30, respectively, of flash unit 16 and actuating lever 20 are mounted on the camera frame 26, also as better seen in FIG. 5.

Figure 4:
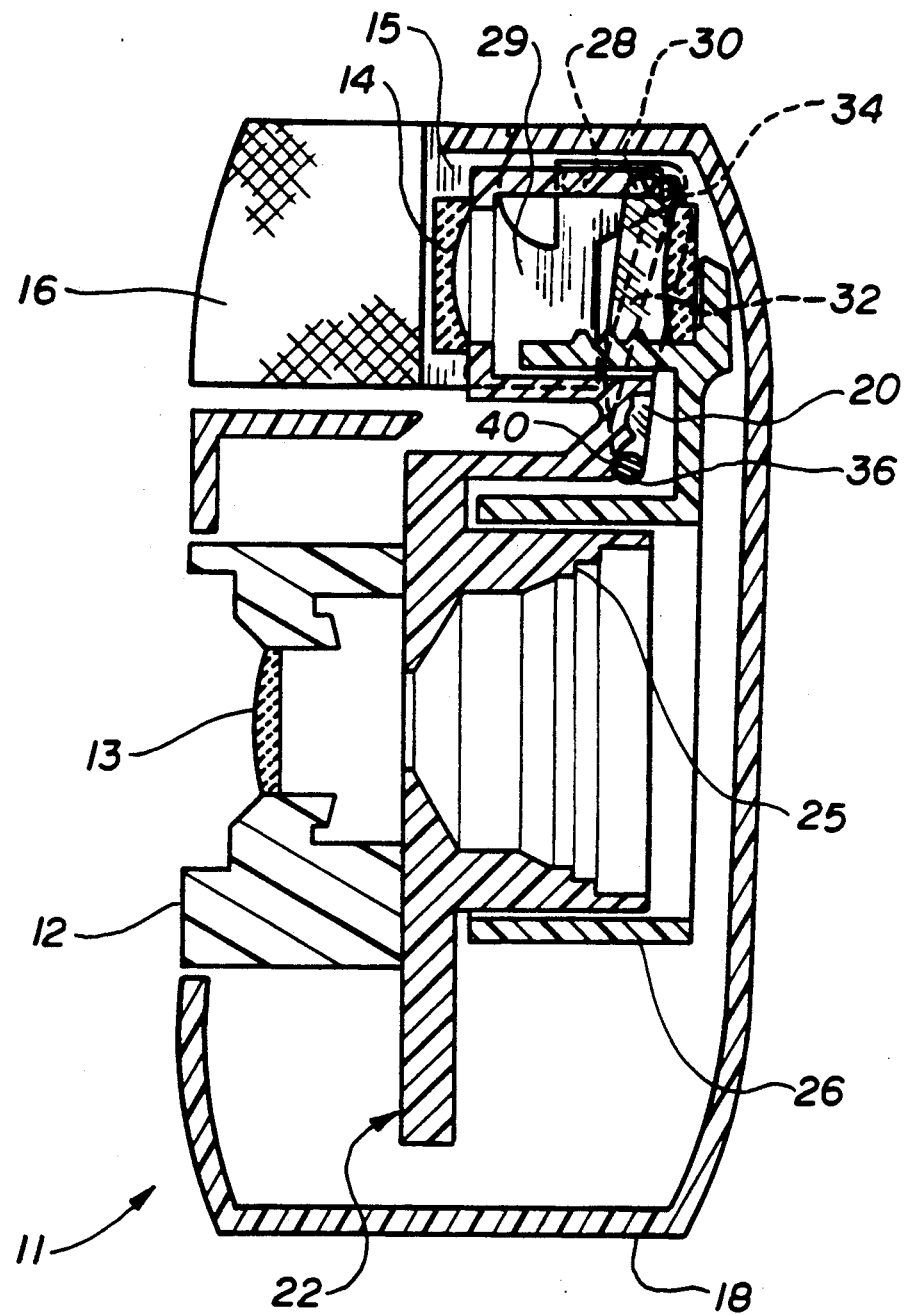
FIG. 4 is a cross-section of the camera of FIG. 3 in its closed, storage position.

The flash unit cam follower pin 34 is located in lever cam slot 32 of the actuating lever 20, the pin and lever together constituting biasing means for mount 22. In the position shown in the FIG. 3 travel of the follower pin has caused the actuating lever 20 to pivot clockwise toward the front of the camera. Such pivoting causes the lever bar 36 to move from lever bar storage notch 40, where it is shown in FIG. 4, to a lever bar locking notch 38. In so doing, the lever bar 36 has been urged or biased against mount 22, the latter being interconnected, for example, with the front viewfinder component 14, light baffle cone 25, and the housing 12 which encloses the lens/shutter assembly 13. Movement of the mount 22, causes the front viewfinder element 14 to move forward in the camera into the recess 15, previously occupied by flash unit 16 in its storage position, and moves the housing 12 and its contained lens/shutter assembly 13 outwardly from the front of the camera. Portions of the frame 26 of the camera and the camera encasement 18 are also illustrated in the Figure.

In moving forward to the position shown, the lens will commonly move by a distance as measured between the lens and the plane of the film in the camera of from about 0.3 to 1 inch, about 0.45 inch being normal, this distance corresponding to the travel of viewfinder element 14.

The flash unit cam follower pin 34 travels downwardly along lever cam slot 32 in actuating lever 20 until such movement causes the actuating lever 20 to move into the stable, angled position illustrated in the Figure with the lever bar 36 being firmly positioned in lever bar locking notch 38. In this position, the components interconnected with mount 22 are stably retained in the position shown in the Figure.

FIG. 4 is a cross-section of the camera, generally 10, in its closed, storage position. The Figure shows the flash unit 16 in its horizontal position in the recess 15 provided in encasement 18 of the camera. When the flash unit 16 is pivoted counterclockwise about flash unit pivot pin 28 from its use position to its storage position the flash unit cam follower pin 34 is forced to its upper-most position in lever cam slot 32 of actuating lever 20. This causes actuating lever 20 to pivot counterclockwise about actuating lever pivot pin 30, moving lever bar 36 from lever bar locking notch 38 downwardly into the lever bar storage notch 40. Such movement eliminates the biasing force of the actuating lever 20 against mount 22, operative in the extended mode of the camera shown in FIG. 3, and allows the mount-return biasing means, springs 42 illustrated in FIG. 5 to become operative. Such biasing means moves mount 22 to the rear of the camera, retracting lens/shutter assembly housing 12 and its enclosed lens/shutter assembly 13 into the camera, and moving the front viewfinder element 14 out of the recess 15 in the encasement 18 which it formerly occupied.

The components of the folding camera described can be made from a variety of materials; however, the use of plastics is preferred since they are non-corrodible and light-weight. Any of a variety of plastics, for example, polystyrene, polycarbonates, or equivalent plastics may all be employed. For example, the frame 26 might conveniently be made from a glass-filled polystyrene, while the mount 22 could be polystyrene or polycarbonate.

FIG. 5 is an isometric, exploded view of the camera of the invention. Shown in the Figure is the mount 22, into which is incorporated components including the lens/shutter assembly housing 12, the front viewfinder element 14, the light baffle cone 25 and the lens/shutter assembly, not shown in the Figure.

Attached to the mount 22 are mount-return biasing means comprising springs 42 which are anchored to the stationary frame of the camera 26 by means of tabs 48, or by equivalent structure. While two return springs are shown, more or less than that number could be employed.

Also illustrated is flash unit 16, pivotal about ninety degrees around flash unit pivot pins 28 positioned in pivot pin bearings 44.

A U-shaped actuating lever 20, including a lever bar 36 and arms 37 with a lever cam slot 32 located therein, are pivotal around actuating lever pivot pins 30, which latter are accepted in actuating lever bearings 46. Flash unit cam follower pins 34 are received in lever cam slots 32, and adapted to move along the camming surfaces thereof. A rear viewfinder element 24 is positionable in frame 26 as shown. The camera encasement 18, not shown in the Figure, is positionable around frame 26, and may be snapped or screwed thereto to provide an integral structure.

While in accordance with the patent statues, a preferred embodiment and best mode has been presented, the scope of the invention is not limited thereto, but rather is measured by the scope of the attached claims.

I claim:

1. A camera including a camera housing, a flash unit movable between a use position wherein the flash unit extends from the housing and a storage position wherein the flash unit is in the housing, a lens/shutter assembly and a viewfinder, characterized in the improvement comprising:
    a movable mount carrying at least part of said lens/shutter assembly and a front component of said viewfinder, said mount being movable between a storage position for protecting the front lens/shutter assembly and an active position for presenting said lens/shutter assembly and said front component for photographic use; and
    mount-biasing means for biasing said mount from the storage position to the active position in response to the movement of said flash unit into the use position, and for biasing said mount from the active position to the storage position in response to the movement of said flash unit into the storage position.

2. A camera according to claim 1 wherein movement of the flash unit includes pivoting of the flash unit between the use and the storage positions, characterized in that the flash unit has first camming means and said mount-biasing means has second camming means for cooperating engagement with said first camming means, said first camming means engaging said second camming means to move said mount-biasing means to the use position when the flash unit pivots to its use position.

3. A camera according to claim 2 said first camming means comprises camming followers in the flash unit, and said mount-biasing means comprises a pivotal actuating lever having said second camming means, said second camming means including camming slots in said lever for receiving said camming followers, said followers urging said lever to move said mount to the active position in response to the pivoting of the flash unit to the use position.

4. A camera according to claim 2 said mount-biasing means further comprises spring means for urging said mount toward the storage position.

5. A camera according to claim 4 wherein said spring means comprises at least one helical spring connected to said mount and to the camera housing.

6. A camera according to claim 1 wherein the camera is provided with an encasement having a recess dimensioned to separately receive both said flash unit and said viewfinder front component, said recess receiving the viewfinder when said mount moves to its storage position and receiving the viewfinder front component when said mount moves to the active position.

7. A camera according to claim 1 wherein said mount carries a light baffle.

8. A camera according to claim 1 in which said mount comprises a lens/shutter housing for at least partially enclosing said lens/shutter assembly.

9. A camera according to claim 1 wherein said movable mount moves along a linear axis.

10. A fixed focus camera including a flash unit pivotal in an arc between storage and use positions, a lens/shutter assembly, and a viewfinder having front and rear components, characterized in the improvement comprising:
    a movable mount carrying the front component of said viewfinder and the lens/shutter assembly, said mount being movable between a retracted storage position for protecting the front component and the lens/shutter assembly, and a forward active position for presenting the carried members for photographic use;
    mount-retracting, biasing means for retracting said mount to the storage position;
    a pivotal actuating lever with camming surfaces, said actuating lever being operable to move said mount to the active forward position; and
    camming surface followers on the flash unit engageable with said camming surfaces of said actuating lever;
    wherein said followers force said lever against said mount in response to the pivoting of the flash unit to its use position, and
    said followers disabling said lever from moving said mount and enabling said mount-retracting biasing means to move said mount to the retracted storage position in response to the pivoting of the flash unit to its storage position.

11. A camera according to claim 10 wherein said camera is further characterized in having a frame member and a camera housing member, said camera housing member being fastened to said frame member.

12. A camera according to claim 10 wherein said movable mount moves along a linear axis.

13. A camera including a flash unit pivotal in an arc between a storage position and a use position, a lens/shutter assembly, and a viewfinder having a front component, characterized by comprising:
- a movable mount carrying the front component and the lens/shutter assembly, said mount being movable between a retractive storage position and forward use position;
- a pivotal actuating lever operatively connected to the flash unit and comprising camming slots and engaging means for engaging and biasing said mount to the forward use position in response to the pivoting of the flash unit to its use position; and
- follower pins on said flash unit operatively connectable with said camming slots, said follower pins moving in said camming slots to move said mounts to the forward use position during the pivoting of the flash unit to its use position.

14. A camera according to claim 13 in which said engaging means comprises a bar connected to said lever, said pins reaching the point during said movement along said slots where said bar becomes locked against said mount after the pivoting of said flash unit into its use position.

15. A camera according to claim 14 wherein said actuating lever is U-shaped, each of its vertical arms having a camming slot parallel to the arms, and the portion of the lever connecting said arms comprises said bar.

* * * * *